United States Patent

Higuchi

[11] Patent Number: 5,823,300
[45] Date of Patent: Oct. 20, 1998

[54] BRAKE DEVICE OF LINEAR MOVING BODY

[75] Inventor: Yasuo Higuchi, Aichi, Japan

[73] Assignee: Pubot Giken Co., Ltd., Aichi, Japan

[21] Appl. No.: 702,698

[22] PCT Filed: Jan. 24, 1996

[86] PCT No.: PCT/JP96/00121

§ 371 Date: Sep. 12, 1996

§ 102(e) Date: Sep. 12, 1996

[87] PCT Pub. No.: WO96/23979

PCT Pub. Date: Aug. 8, 1996

[30] Foreign Application Priority Data

| Jan. 31, 1995 | [JP] | Japan | 7-50302 |
| Mar. 23, 1995 | [JP] | Japan | 7-104524 |
| Dec. 15, 1995 | [JP] | Japan | 7-351722 |

[51] Int. Cl.⁶ .......... B65H 59/10; F15B 15/26; F16D 63/00
[52] U.S. Cl. .......... 188/67; 92/15; 92/25; 16/DIG. 17; 248/410; 188/265
[58] Field of Search .......... 188/67, 265, 300, 188/129, 381; 303/89; 91/42, 44, 43, 41; 92/24, 25, 26, 27, 28, 15, 20, 30; 267/64.12; 297/375; 274/531; 248/410; 24/489, 490, 649, 524; 16/DIG. 17, 82

[56] References Cited

U.S. PATENT DOCUMENTS

| 836,303 | 11/1906 | Christensen | 248/410 |
| 1,227,941 | 5/1917 | Sauvage | 188/196 P |
| 2,090,550 | 8/1937 | Pilblad | 248/410 |
| 2,363,229 | 11/1944 | Cade . | |
| 2,759,569 | 8/1956 | Keehn | 188/265 |
| 2,806,723 | 9/1957 | Fairclough | 248/410 |
| 2,871,713 | 2/1959 | House | 188/265 |
| 2,873,579 | 2/1959 | Safford | 92/28 |
| 2,893,766 | 7/1959 | Meyer . | |
| 3,037,819 | 6/1962 | Sukala | 188/265 |
| 3,334,931 | 8/1967 | Holt et al. | 248/410 |
| 3,586,138 | 6/1971 | Engle | 188/265 |
| 3,826,176 | 7/1974 | Ika | 92/25 |
| 3,828,893 | 8/1974 | Clark | 188/67 |

(List continued on next page.)

FOREIGN PATENT DOCUMENTS

| 2074249 | 9/1971 | France . |
| 57-52404 | 11/1982 | Japan . |
| 59-223551 | 12/1984 | Japan . |
| 3-38487 | 8/1991 | Japan . |
| 1 314 850 | 4/1973 | United Kingdom . |

Primary Examiner—Douglas C. Butler
Attorney, Agent, or Firm—Nikaido, Marmelstein, Murray & Oram LLP

[57] ABSTRACT

In a brake device of a linear moving body, a brake member is provided with a hole and a rod is fitted to the hole in clearance fit, and the brake member is moved slantwise and rotational moment is produced in the brake member thereby brake is applied to the rod in relative motion. The brake member is arranged movable slantwise using position as fulcrum remote from the axial center of the rod, and notched portions having width smaller than diameter of the hole are formed at symmetric positions within the hole along a plane including the fulcrum and the axial center of the rod. In this brake device, rotational force (rotational moment) is supplied to the brake member, and drag is produced at a fitting surface within the hole and frictional force due to the drag is made brake force and frictional force due to the drag of the fitting surface is made reaction force of the rotational force. Thereby the reaction force in parallel to the rotational moment is scarcely produced, and the reaction force orthogonal to the rotational moment is produced largely. Since the reaction force orthogonal to the rotational moment increases with the thrust, large drag is produced from small rotational moment and strong brake force is generated to the rod and the brake device and the rod are locked.

5 Claims, 5 Drawing Sheets

U.S. PATENT DOCUMENTS

| | | | |
|---|---|---|---|
| 3,893,730 | 7/1975 | Homier et al. | 188/67 |
| 4,054,190 | 10/1977 | Wilkes | 248/410 |
| 4,214,795 | 7/1980 | Kakuminato | 91/41 |
| 4,268,093 | 5/1981 | Müller | 92/28 |
| 4,564,088 | 1/1986 | Takahashi et al. | 188/67 |
| 4,664,549 | 5/1987 | Lundquist | 248/410 |
| 4,791,855 | 12/1988 | Matsui | 188/67 |
| 4,981,069 | 1/1991 | Matsui | 92/15 |
| 5,131,115 | 7/1992 | Sarto | 16/DIG. 17 |
| 5,224,681 | 7/1993 | Lundstrom | 248/410 |
| 5,529,148 | 6/1996 | O'Leary | 188/67 |

BRAKE DEVICE OF LINEAR MOVING BODY

TECHNICAL FIELD

The present invention relates to brake devices of linear moving body where a piston rod of air cylinder is stopped by applying brake by frictional force, and more particularly to a brake device for a linear moving body where force in the direction of linear motion is utilized in brake force thereby the device can be manufactured in small size and at low cost and can be utilized for the falling prevention of the linear moving body and the emergency stop.

BACKGROUND ART

In the prior art, as a brake device for a linear moving body, U.S. Pat. No. 4,791,855 discloses a device for stopping a piston rod of an air cylinder by applying brake by frictioal force.

The invention in the prior art adopts mechanism that a brake member is rotated in orthogonal direction to the linear motion thereby the brake force is increased, and force in the direction of the linear motion can not be utilized for the brake force. Therefore the strong spring force and the complicated force increasing mechanism are required, and the manufacturing cost becomes high and the device becomes large size.

Further U.S. Pat. No. 4,981,069 also discloses a device for stopping a piston rod of an air cylinder by applying brake by frictional force.

The invention in the prior art adopts mechanism that a brake member is elastically deformed in orthogonal direction to the linear motion and the reaction force is made brake force. Also in this invention, force in the direction of the of the linear motion can not be utilized for the brake force. Therefore the strong elastic deforming force is required and further the strong brake releasing force is required. Also since the elastic deforming force is utilized, problem of variation of the brake force and dispersion of the brake force are produced, and quite high machining precision is required. This causes state that the device becomes large size and the manufacturing cost becomes high.

Also as the prior art closest to the present invention, an air cylinder is manufactured where a brake member of ring shape is fitted to a piston rod of an air cylinder in clearance fit, and the brake member is moved slantwise in the axial direction of the rod by the spring force, and further the slantwise motion is increased by the thrust of the air cylinder and the piston rod is locked.

This brake device is similar to the present invention in the point that the force in the direction of the linear motion is utilized for the brake force. However, this brake device is significantly different from the present invention in shape of a fitting surface between a piston rod and a through hole of a brake member. That is, in this brake device, when rotational moment is supplied to a brake member by a spring and thrust of an air cylinder and the brake member is moved slantwise and brake is applied, most of the reaction force of the rotational moment is the reaction force produced in parallel to the rotational moment, and most of the brake force applied to the piston rod becomes a value of the reaction force in parallel to the rotational moment multiplied by the friction coefficient.

Therefore since usual friction coefficient is about 0.2, in order to produce effective brake force in this brake device, a problem exists in that much reaction force is required. Also in such a brake device, in order to produce large reaction force, a method of increasing the spring force and increasing distance between fulcrums of the rotational moment produced by the thrust of the air cylinder, a method of decreasing dimension in the direction of the linear motion of the brake member or the like may be considered. However, the former causes large size of the brake device and is not suitable for the practical use, and the latter has a problem that the contact surface pressure of the piston rod is increased and the outer circumference of the piston rod is liable to be flawed and the brake member is liable to be broken.

DISCLOSURE OF THE INVENTION

An object of the present invention is to provide a brake device for applying brake to a linear moving body and stopping it, where the brake device is small size and can be manufactured at low cost and is suitable for use in falling prevention or emergency stop.

A brake device for a linear moving body according to the present invention where a hole is provided on a brake member and a rod is fitted to the hole in clearance fit and the brake member is moved slantwise and the rotational moment is produced in the brake member thereby brake is applied to the moving rod relatively, characterized in that the brake member is arranged movable slantwise at position as fulcrum remote from the axial center of the rod, and a notched portion having width smaller than diameter of the hole is formed at the symmetric position within the hole along the plane including the fulcrum and the axial center of the rod.

In such brake device, rotational force (rotational moment) is supplied to the brake member and drag is produced at the fitting surface within the hole and frictional force due to the drag is made brake force and the frictional force due to the drag of the fitting surface is made reaction force. Thereby large drag can be produced by small rotational force, and thickness of the brake member in the direction of the linear motion also can be made large.

That is, in the brake device of the present invention, the reaction force from the rod is produced when the rotational force (rotational moment) M is supplied to the brake member, and assuming that the reaction force is decomposed into component of force (sum total of absolute value) R in parallel to the rotational force M and component of force (sum total of absolute value) r orthogonal to the rotational force M, and radius of gyration of the component of force is L and coefficient of friction is k, following equation applies.

$$M=RL+krL \quad (1)$$

Next, assuming that thrust of the linear moving body is F, next equation applies. In this case, the rotational force produced by F is added to M as above described.

$$F=kR+kr \quad (2)$$

Further, in order to clarify function of the brake device of the present invention, it will be put strongly as follows.

Assume that only the component of force in parallel to the rotational force is produced, that is, if r=0, from equations (1), (2), it follows that $$F=Mk/L \quad (3)$$

On the contrary, assuming that only the component of force orthogonal to the rotational force is produced, that is, if R=0, from equations (1), (2), it follows also that $$F=M/L \quad (4)$$

Here, assume that the rotational force due to the thrust F is excluded. Then value of the thrust F is due to the rotational force of a spring only and becomes a value comprising the stability (initial slip is eliminated and locking is performed securely).

Comparing the equation (3) with the equation (4), the brake force in the case of only the component of force orthogonal to the rotational force becomes 1/k of that in the case of only the component of force in parallel to the rotational force. For example, if k=0.2, it follows that the stability becomes five times. Also comparing the rotational force M when the thrust F is constant in the equations (3), (4), it is seen that the spring force to be used may be ⅕ and further the brake releasing force may be also ⅕. This is factor to enable small size and low price.

Further, when the thrust F and the rotational force M are constant in the equations (3), (4), the durability, that is, the brake surface pressure can be compared by the value of the gyration radius L. Here, if k=0.2, when only the component of force orthogonal to the rotational force is produced, the durability becomes five times of that when only the component of force in parallel to the rotational force is produced. This enables the state that the outer circumference is not flawed and the brake member can be prevented from being broken.

The above description is the extreme view, but can clarify the point that the present invention has not only the quantitative difference but also the qualitative difference in comparison with the prior art. As values of an actual brake device, the above-mentioned value ⅕ of the spring force will become about ½.5 and the stability or the durability will become about 2.5 times.

BEST MODE FOR CARRYING OUT THE INVENTION

Embodiments of the present invention will be described based on the accompanying drawings as follows.

Figure 1:
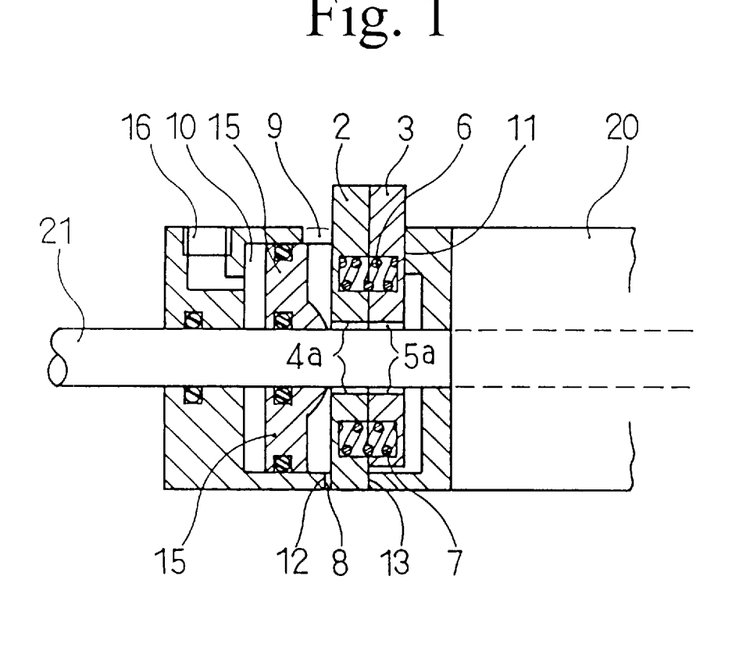
FIG. 1 is a sectional view in axial direction of a brake device of an air cylinder showing an embodiment of the invention in brake release state.
Figure 2:
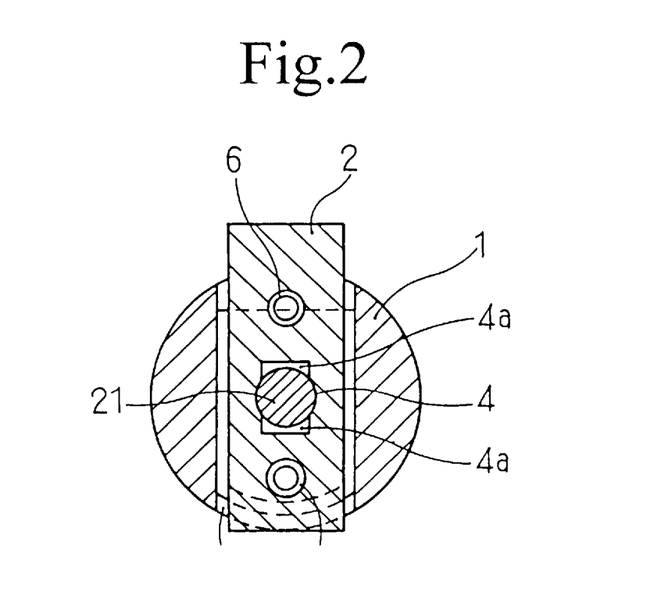
FIG. 2 is a lateral sectional view of the brake device.
Figure 3:
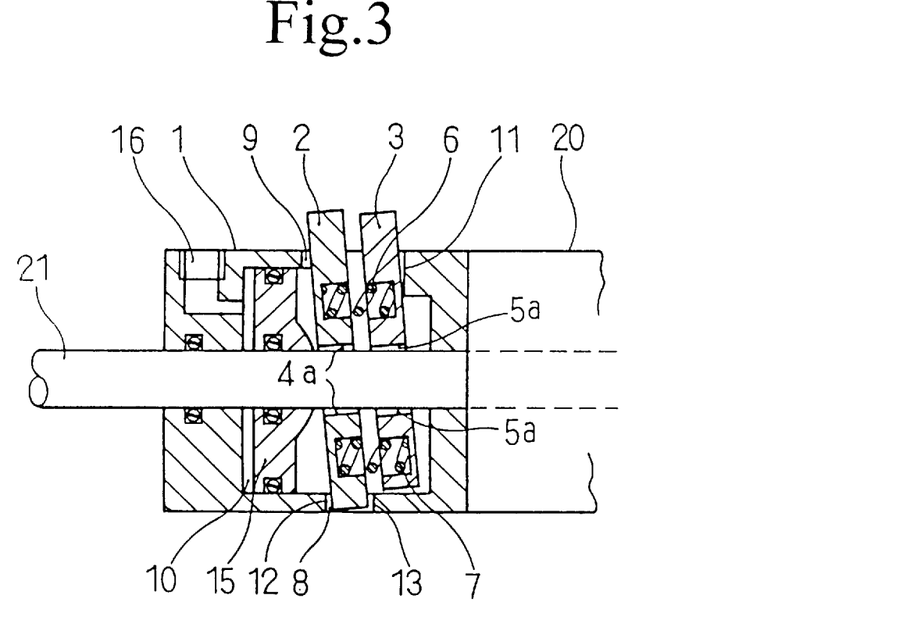
FIG. 3 is a sectional view in axial direction of the brake device in brake state.

FIGS. 1 to 3 show a brake device of an air cylinder. In the brake device, a casing 1 is fixed and installed at top end portion of an air cylinder 20, and a piston rod 21 penetrates within the casing 1. Within the casing 1, as shown in the figures, a brake member 2 and a brake member 3 both in plate shape are arranged with gap, and the brake member 2 is installed movable slantwise using the lower end portion as fulcrum and the brake member 3 is installed movable slantwise using the upper portion as fulcrum. The brake member 2 is used for braking of the piston rod during pushing out, and the brake member 3 is used for braking of it during drawing back.

Through holes 4, 5 for insertion of the piston rod 21 are formed nearly at the center of the brake members 2, 3, and the through holes 4, 5 are provided with notched portions 4a, 5a (recess) extended at upper side and lower side within a circular hole to enable fitting of the piston rod 21 in clearance fit. Width of each of the notched portions 4a, 5a (recess) is smaller than diameter of the circular hole of the through holes 4, 5 and is about 90% of the diameter.

The diameter of the circular hole of the through holes 4, 5 is formed slightly larger than outer diameter of the piston rod 21 and the clearance fit is conducted, and width of rectangular notched portions 4a, 5a is formed smaller than diameter of the piston rod 21. For example, when outer diameter of the piston rod 21 is 20 mm, diameter of the circular hole of the through holes 4, 5 is formed in 20.1 to 20.2 mm and width of the rectangular notched portions 4a, 5a is formed in 18 mm.

The piston rod 21 is inserted to the through holes 4, 5 of such two brake members 2, 3 and the brake members 2, 3 are fitted externally to the outer circumferential part of the piston rod 21 within the casing 1 loosely. Coiled springs 6, 7 are interposed between the two brake members 2, 3 at upper side and lower side thereof, and the spring force of the coiled springs 6, 7 energizes both brake members 2, 3 in the direction of separating both brake members 2, 3 from each other. Also the coiled springs 6, 7 are attached to both brake members 2, 3 in the state that both ends of the spring are inserted in holes provided on one surface of each of both brake members 2, 3.

One brake member 2 is formed a little longer longitudinally than other brake member 3, and lower end portion of the brake member 2 is loosely inserted to a rectangular aperture 8 formed at the bottom of the casing 1. Upper end portions of both brake members 2, 3 are projected upward together from a rectangular aperture 9 formed to the top of the casing 1. The front side of the aperture 9 is formed in large amount so as to have a margin (space), and the brake member 2 can be slanted forward, i.e., to the pushing-out side in range of some degree.

The coiled spring 6 of upper side acts at braking state so as to push the brake member 3 to an abutting end surface 11 at the rear side of the aperture 9, i.e., at the drawing-back side, and the coiled spring 7 of lower side acts so as to push the brake member 2 to an abutting end surface 12 at the front side of the aperture 8, i.e., at the pushing-out side. An abutting end surface 13 is formed at the rear side of the aperture 8, i.e., at the drawing-back side.

Position of the end surface 13 of the aperture 8 at lower side and the end surface 11 of the aperture 9 at upper side is determined as shown in FIG. 3 so that when the brake members 2, 3 are pushed in the drawing-back direction by a brake releasing piston 15 as described later, lower side of the brake member 2 abuts on the end surface 13 and upper side of the brake member 3 abuts on the end surface 11, then the brake members 2, 3 are positioned orthogonal to the axial direction of the piston rod 21 thereby the brake is released.

A cylinder chamber 10 is formed at front side within the casing 1, and a brake releasing piston 15 is fitted slidable to the cylinder chamber 10. Since the piston rod 21 is inserted at the center of the cylinder chamber 10, the piston 15 is arranged to be externally fitted slidable to the outer circumferential part of the piston rod 21. Also a swelling portion is provided at the center of the top end of the piston 15, and the brake member 2 pushed in the drawing-back direction by the swelling portion.

An air inlet port 16 for air inlet into the cylinder chamber 10 is provided at upper side of the casing 1. A seal member is applied to the outer circumferential part and the inner circumferential part of the brake releasing piston 15, and a seal member is applied also to a support part of the piston rod 21 at the front side of the casing 1.

Next, operation of the brake device in the above-mentioned configuration will be described. When air is supplied from the air inlet port 16 provided at the casing 1, the piston 15 is moved in the right direction in the figure, and the brake members 2, 3 are pushed by the piston 15. The coiled springs 6, 7 are compressed as shown in FIG. 1, and a lower portion of the brake member 2 abuts on the end surface 13 and an upper portion of the brake member 3 abuts on the end surface 11, and the brake members 2, 3 become the orthogonal state to the piston rod 21. Thereby the fitting surface of the brake members 2, 3 to the rod 21 within the through holes 4, 5 becomes parallel to the outer circumferential surface of the rod 21, and the non-brake state is produced and the piston rod 21 can be moved.

On the other hand, when air is exhausted from the port 16 provided on the casing 1, the piston 15 becomes the free state and the brake members 2, 3 are moved slantwise by the spring force of the coiled springs 6, 7 as shown in FIG. 3. Then the brake members 2, 3 are supplied with initial rotational force (rotational moment) using the end surface 12 and the end surface 11 as fulcrums respectively by the coiled springs 6, 7, and the reaction force of the rotational force is produced at the fitting surface of the brake members 2, 3 to the piston rod 21 within the through hole and frictional force in response to the reaction force produced on the fitting surface is generated between the brake members 2, 3 and the rod 21 in the initial state.

In this state, if the thrust in the left direction in the figure is applied to the rod 21, the rotational force due to the thrust using the end surface 12 as fulcrum is further applied to the brake member 2. Also if the thrust in the right direction is applied to the piston rod 21, the rotational force due to the thrust using the end surface 11 as fulcrum is applied to the brake member 3. The rotational force (rotational moment) due to the thrust increases the frictional force becomes the brake members 2, 3 and the piston rod 21 and the strong brake force is produced in the piston rod 21 thereby the piston rod 21 is fixed to the casing I through the brake members 2, 3.

Thus shape of the inner surface of the through holes 4, 5 of the brake members 2, 3, i.e., the fitting surface between the piston rod 21 and the brake members 2, 3 is in that the hole to be fitted to the piston rod 21 in clearance fit is notched at an upper portion and a lower portion.

That is, notched portions 4a, 5a are formed on symmetric positions within the through holes along the plane including the fulcrum of the brake members 2, 3 and the axial center of the rod, and width of the notched portions 4a, 5a is smaller than diameter of the through holes 4, 5. Therefore when the brake members 2, 3 are moved slantwise and the rotational force using the end surface 12 or 11 as fulcrum is applied, since the reaction force subjected to the rod 21 from the fitting surface of the brake member is not produced from the notched portions 4a, 5a, the component of force in parallel to the rotational moment is scarecely produced but the component of force orthogonal to the rotational moment is produced largely. Therefore large frictional force is produced at the fitting surface and the strong brake force can be generated.

Next, result of a trial experiment of a brake device will be described concretely. The brake device in the above-mentioned configuration is manufactured in that the outer diameter of the piston rod is 20 mm, thickness of the brake member in the axial direction is 15 mm, width of the notched portion of the through hole of the brake member is 18 mm, the outer diameter of the piston 15 is 63 mm, and material of the piston rod is carbon steel (carbon 0.5%) and material of the brake member is ductile cast iron.

As a result of a performance test of the brake device, even if the thrust 900 kgf is applied to the piston rod, slip is not produced, and the brake device withstands the durability test of 3,000,000 times that the thrust 300 kgf is applied to the piston rod. In addition, in the above-mentioned brake device, when the brake is applied in the gravity direction, a spring is not used and the brake can be applied by the gravity of the brake member itself. Also the piston brake may be released by an electromagnetic solenoid or manual operation. Further in the above-mentioned embodiment, although the brake device is represented where the brake is applied to both sides in the linear motion direction, in the brake device where the brake is applied to one side only, one brake member and one spring may be used.

Figure 4:
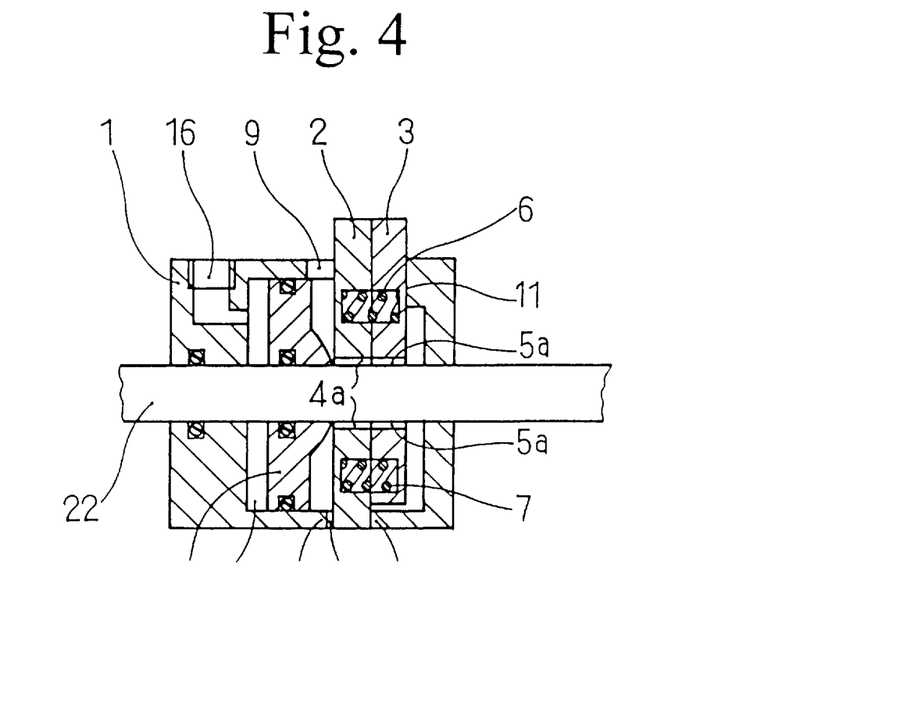
FIG. 4 is a sectional view in axial direction of a brake device in another embodiment.
Figure 5:
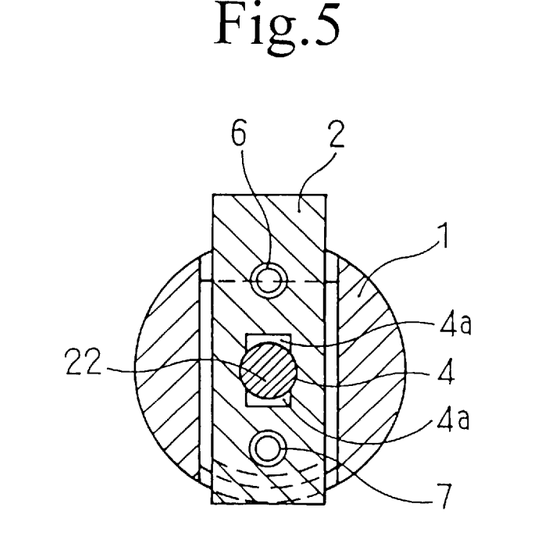
FIG. 5 is a lateral sectional view of the brake device.
Figure 6:
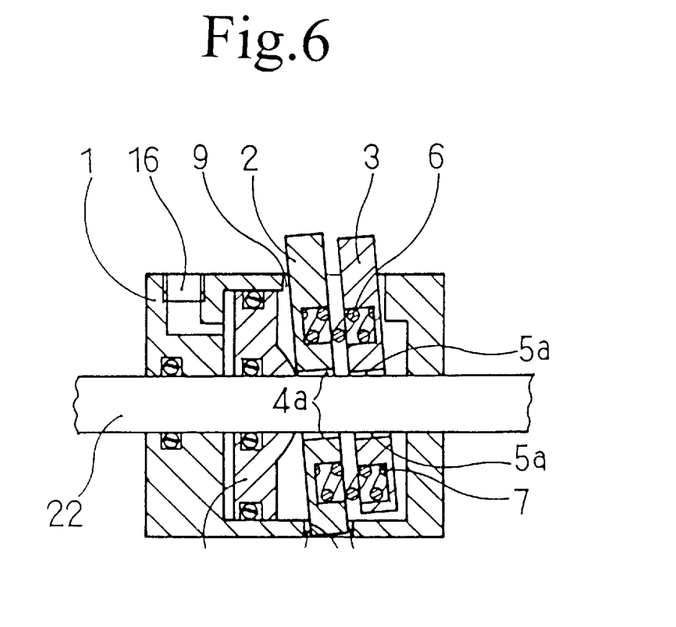
FIG. 6 is a sectional view in axial direction of the brake device in brake state.

FIGS. 4 to 6 show another embodiment where the invention is applied to a brake device of a moving part of a rodless cylinder. This brake device is used to braking for a guide rod 22 of a moving table of a rodless cylinder (not shown). In addition, in FIGS. 4 to 6, parts having the same structure as those in the above-mentioned embodiment are designated by the same reference numerals, and the description shall be omitted.

In this brake device, a casing 1 is fixed to a moving table of a rodless cylinder, and a guide rod 22 guiding a moving table or a linear moving body connected to the moving table in place of the piston rod is inserted into the piston rod. Structure of the casing 1, brake members 2, 3 arranged within it, a cylinder chamber 10, a brake releasing piston 15 and the like is similar to that of the above-mentioned embodiment.

When air is supplied from an air inlet port 16 provided on the casing 1, the piston 15 is moved in the right direction in the figure and the brake members 2, 3 are pushed by the piston 15. As shown in FIG. 4, coiled springs 6, 7 are compressed and a lower part of the brake member 2 abuts on an end surface 13, and an upper part of the brake member 3 abuts on an end surface 11 thereby the brake members 2, 3 become orthogonal to the piston rod 22. Therefore the fitting surface of the brake members 2, 3 to the rod 22 within the through holes 4, 5 becomes parallel to the outer circumferential surface of the rod 22 and non-braking state is produced and the piston rod 22 can be moved.

On the other hand, when air is exhausted from the air inlet port 16 provided on the casing 1, the piston 15 becomes the free state, and the brake members 2, 3 are moved slantwise by the spring force of the coiled springs 6, 7 as shown in FIG. 6. Then the brake members 2, 3 are supplied with the initial rotational force (rotational moment) using the end surface 12 and the end surface 11 as fulcrums respectively by the coiled springs 6, 7, and the reaction force of the rotational force is produced at the fittingt dsurface between the brake members 2, 3 and the piston rod 22 within the through hole, and the frictional force in response to the reaction force produced at the fitting surface is generated between the brake members 2, 3 and the rod 22 at the initial state.

In this state, if the thrust in the left direction in the figure is applied to the rod 22, the rotational force due to the thrust using the end surface 12 as fulcrum is further applied to the brake member 2. Also if the thrust in the right direction is applied to the piston rod 21, the rotationall force due to the thrust using the end surface 11 as fulcrum is applied to the brake member 3. The rotational force (rotational moment) due to the thrust increases the frictional force between the brake members 2, 3 and the piston rod 22 and the strong brake force is produced to the piston rod 22 and the casing 1 is fixed to the rod 22 through the brake members 2, 3.

Thus when the brake members 2, 3 are moved slantwise and the rotational force using the end surface 12 or 11 as fulcrum is applied, since the reaction force subjected to the rod 21 from the fitting surface of the brake member is not produced from the notched portions 4a, 5a, the component of force in parallel to the rotational moment scarecely generated but the component of force orthogonal to the rotational moment is generated largely. Therefore the large frictional force is produced at the fitting surface and the strong brake force can be generated.

Figure 7:
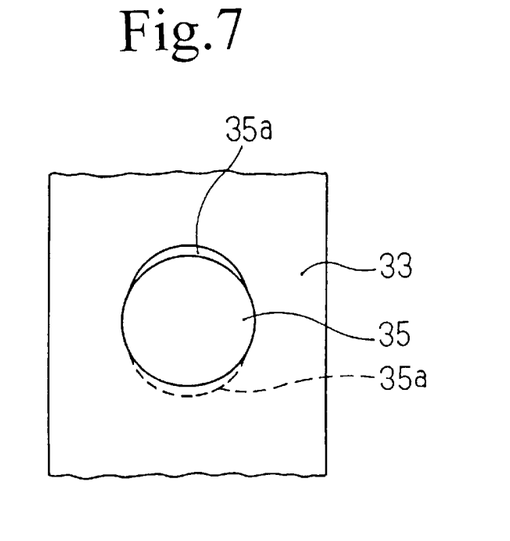
FIG. 7 is a front view of a brake member in another embodiment.
Figure 8:
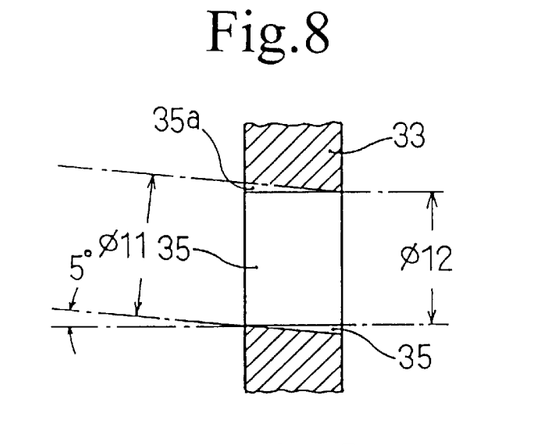
FIG. 8 is a sectional view of FIG. 7.

In addition, shape of notched portions of a circular hole of a brake member, besides a rectangular shape as above described, may be a notched portion comprising a part of an outer circumferential part of a cylinder as shown in FIGS. 7 and 8. That is, in a brake member 33 shown in FIGS. 7 and 8, a through hole 35 is formed in that for example, a notched portion 35a to constitute a part of an outer circumferential part of a cylinder is extended at upper side and lower side of a circular hole of diameter 12 mm. This notched portion 35a can be formed in that for example, a drill of outer diameter 11 mm is advanced in slanting to the axis of the circular through hole 35 by 5 degrees for example.

Figure 9:
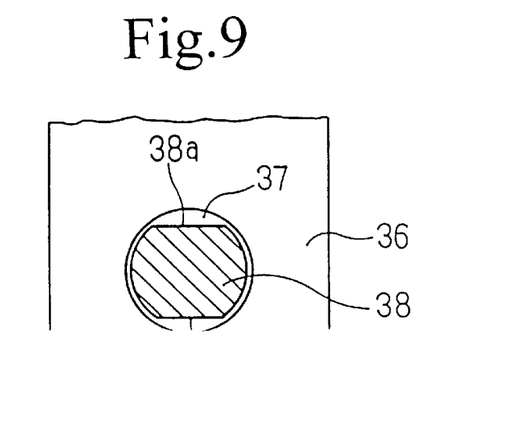
FIG. 9 is a fragmentary sectional view of a brake member and a rod in another embodiment.

Further as shown in FIG. 9, a circular through holes 37 is formed on a brake member 36 and an upper surface and a lower surface of a piston rod 38 are cut horizontally thereby a flat portion 38a (notched portion) may be provided at the upper side and lower side of the outer circumferentia part of the rod.

Thus in the above-mentioned brake device, the brake members 2, 3 having relatively simple shape and not requiring severe dimension precision are arranged within the casing I and the actuator for the brake releasing is installed thereby the brake device can be constituted very simply. Consequently the brake device can be manufactured in small size and low cost, and can be used effectively for emergency stop of the piston rod of the fluid pressure cylinder or for intermediate stop and further as a brake device for the falling prevention where falling of a piston rod or a suspended substance at the stop state is prevented.

Figure 10:
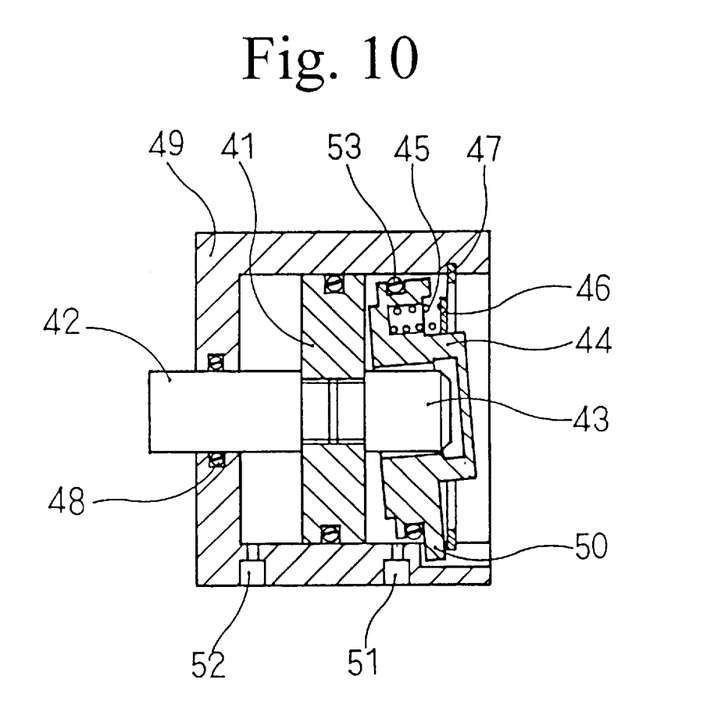
FIG. 10 is a sectional view in axial direction of a falling preventing device of a piston rod to which the invention is applied.
Figure 11:
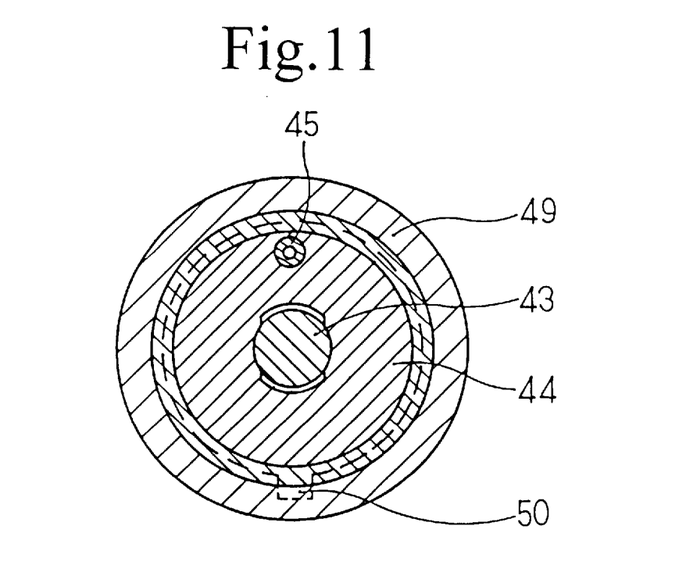
FIG. 11 is a lateral sectional view of FIG. 10.

FIGS. 10 and 11 show another embodiment, where the brake device is applied for the falling prevention of a piston rod of an air cylinder. In FIG. 10, a piston 41 is fitted slidable within a cylinder of a cylinder body 49. A piston rod 42 is installed to the front side of the piston 41, and a brake rod 43 is installed at the rear side of the piston 41. The brake rod 43 may be formed integral with the piston rod 42.

A brake member 44 inserted at the end within the cylinder body is formed in piston shape having a cylinder outer surface smaller than a cylinder inner surface of the cylinder body 49, and a projecting part 50 is installed to the lower side of the brake member 44 and a seal member 53 is fitted to the outer circumferential part of the brake member 44. The projecting part 50 of the brake member 44 is engaged with the cylinder side, and the brake member 44 is fitted within the cylinder body 49 so that it can be moved slantwise using the projecting part 50 as fulcrum within the plane including the axial center of the rod 43.

A hole to be fitted partially to the brake rod 43 is provided at the center of the brake member 44, and a hole for mounting a spring 45 is provided at the upper side of the brake member 44. The brake member 44 is assembled within the cylinder body 49 by a snap ring 47, and is mounted using the abutting position of the projecting part 50 as fulcrum in movable state slantwise slightly (about 5 degrees). The spring 45 is installed between a spring shoe 46 and the brake member 45 supplies the initial rotational force (rotational moment) to the brake member 44.

Next, operation of the brake device will be described.

If air is supplied from an air inlet port 51, the brake member 44 overcomes the force of the spring 45 and is pushed to the snap ring 47 and becomes orthogonal to the brake rod 43. Thereby the brake release state is produced and the piston 41 is moved normally.

Next, if air is supplied from the air inlet port 52 and is exhausted from the air inlet port 51, the brake member 44 is slanted by the spring 45, but since the spring force is quite weak, the brake rod 43 is fitted to the hole of the brake member 44. Next, if air is exhausted from the air inlet port 52, the rotational force using the projecting part 50 as fulcrum is applied to the brake member 44 by the spring 45 and the brake member 44 is moved slantwise. The reaction force of the rotational force produces the frictional force between the brake rod 43 and the brake member 44.

In this state, if the load due to the gravity of the movable part or the like is applied to the piston rod 42 in the direction of pushing out the piston rod 42, the rotational force using the projecting part 50 as fulcrum is applied further to the brake member 44 and the large frictional force is applied between the brake member 44 and the brake rod 43. The brake is applied to the piston due to the frictional force and the falling of the piston rod (movable part) can be prevented.

I claim:

1. A brake device for a linear moving body, comprising:
a rod having a cylindrical outer circumferential surface and a center axis; and
a brake member having two opposite end surfaces orthogonal to said center axis of said rod and a hole with a cylindrical inner circumferential surface, said rod extending at least into said hole and having a clearance fit therein, said cylindrical inner circumferential surface of said hole of said brake member to be fitted to said cylindrical outer circumferential surface of said rod, said brake member being arranged movable slantwise using a position remote from said axis of said rod as a fulcrum,
wherein notched surfaces are formed in the cylindrical inner circumferential surface of said brake member, said notched surfaces being defined by opposite surfaces in parallel to a slanting direction of said brake member,
and frictional surfaces are provided in at least four positions where one end surface, one notched surface and the cylindrical inner circumferential surface after notching, intersect with each other.

2. A brake device for a linear moving body, comprising:
a casing having an inside; a rod which passes in relative linear motion through said inside of said casing, said rod having a cylindrical outer circumferential surface and a center axis; and a brake member arranged movable slantwise within said casing using a position remote from said axis of said rod as a fulcrum, said brake member having a cylindrical inner circumferential surface to be fitted to said cylindrical outer circumferential surface of said rod and two opposite end surfaces orthogonal to said center axis of said rod, wherein notched surfaces are formed in the cylindrical inner circumferential surface of said brake member, said notched surfaces being defined by opposite surfaces in parallel to a slanting direction of said brake member, and frictional surfaces are provided in at least four positions where one end surface, one notched surface and the cylindrical inner circumferential surface after notching, intersect with each other.

3. The brake device for a linear moving body as set forth in claim 2, further comprising a spring supplying an initial rotational moment to said brake member.

4. The brake device for a linear moving body as set forth in claim 3, further comprising an actuator returning the slantwise motion of said brake member to the original state to release the brake.

5. The brake device for a linear moving body as set forth in claim 4, wherein said actuator includes a piston arranged within said casing bearable against said brake member.

* * * * *